(12) United States Patent
Kim et al.

(10) Patent No.: US 9,343,924 B2
(45) Date of Patent: May 17, 2016

(54) METHOD AND WEARABLE DEVICE FOR ENERGY SHARING NETWORK

(71) Applicant: SAMSUNG ELECTRONICS CO., LTD., Suwon-si (KR)

(72) Inventors: Sang Joon Kim, Hwaseong-si (KR); Min Young Mun, Seoul (KR); Chang Mok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 14/080,163

(22) Filed: Nov. 14, 2013

(65) Prior Publication Data

US 2014/0285134 A1    Sep. 25, 2014

(30) Foreign Application Priority Data

Mar. 25, 2013 (KR) .................. 10-2013-0031421

(51) Int. Cl.
  *H02J 7/00* (2006.01)
  *H02J 7/02* (2016.01)
  *H02J 5/00* (2016.01)
  *H02J 17/00* (2006.01)

(52) U.S. Cl.
  CPC .............. *H02J 7/025* (2013.01); *H02J 5/005* (2013.01); *H02J 17/00* (2013.01)

(58) Field of Classification Search
  CPC ........... H02J 7/025; H02J 5/005; H02J 17/00; H02J 7/0054
  USPC ........................................ 320/103
  See application file for complete search history.

(56) References Cited

U.S. PATENT DOCUMENTS

| 5,914,585 | A | 6/1999 | Grabon |
| 8,140,143 | B2 | 3/2012 | Picard et al. |
| 2003/0163827 | A1 | 8/2003 | Purpura |
| 2010/0323704 | A1* | 12/2010 | Tailor et al. ................ 455/438 |
| 2011/0022025 | A1 | 1/2011 | Savoie et al. |
| 2011/0278944 | A1 | 11/2011 | Eckhoff et al. |
| 2011/0282415 | A1 | 11/2011 | Eckhoff et al. |
| 2012/0159215 | A1* | 6/2012 | Kim et al. ..................... 713/321 |
| 2012/0229270 | A1 | 9/2012 | Morley et al. |
| 2012/0235634 | A1 | 9/2012 | Hall et al. |
| 2013/0043738 | A1* | 2/2013 | Park et al. .................... 307/104 |

FOREIGN PATENT DOCUMENTS

| JP | 2002-186022 | 6/2002 |
| JP | 2010-142373 | 7/2010 |
| KR | 10-0486739 | 5/2005 |
| KR | 10-2011-0127203 | 11/2011 |
| KR | 10-1093092 | 12/2011 |
| KR | 10-2012-0047970 | 5/2012 |
| KR | 10-2012-0081583 | 7/2012 |

* cited by examiner

*Primary Examiner* — Vuthe Siek
(74) *Attorney, Agent, or Firm* — NSIP Law

(57) ABSTRACT

A device and a method for an energy sharing network may include an energy store configured to store energy; an energy transmitter-receiver configured to transmit energy and energy related information to at least one neighbor device and to receive energy and energy related information from at least one neighbor device; and a controller configured to control the energy transmitter-receiver based on a predetermined condition.

26 Claims, 6 Drawing Sheets

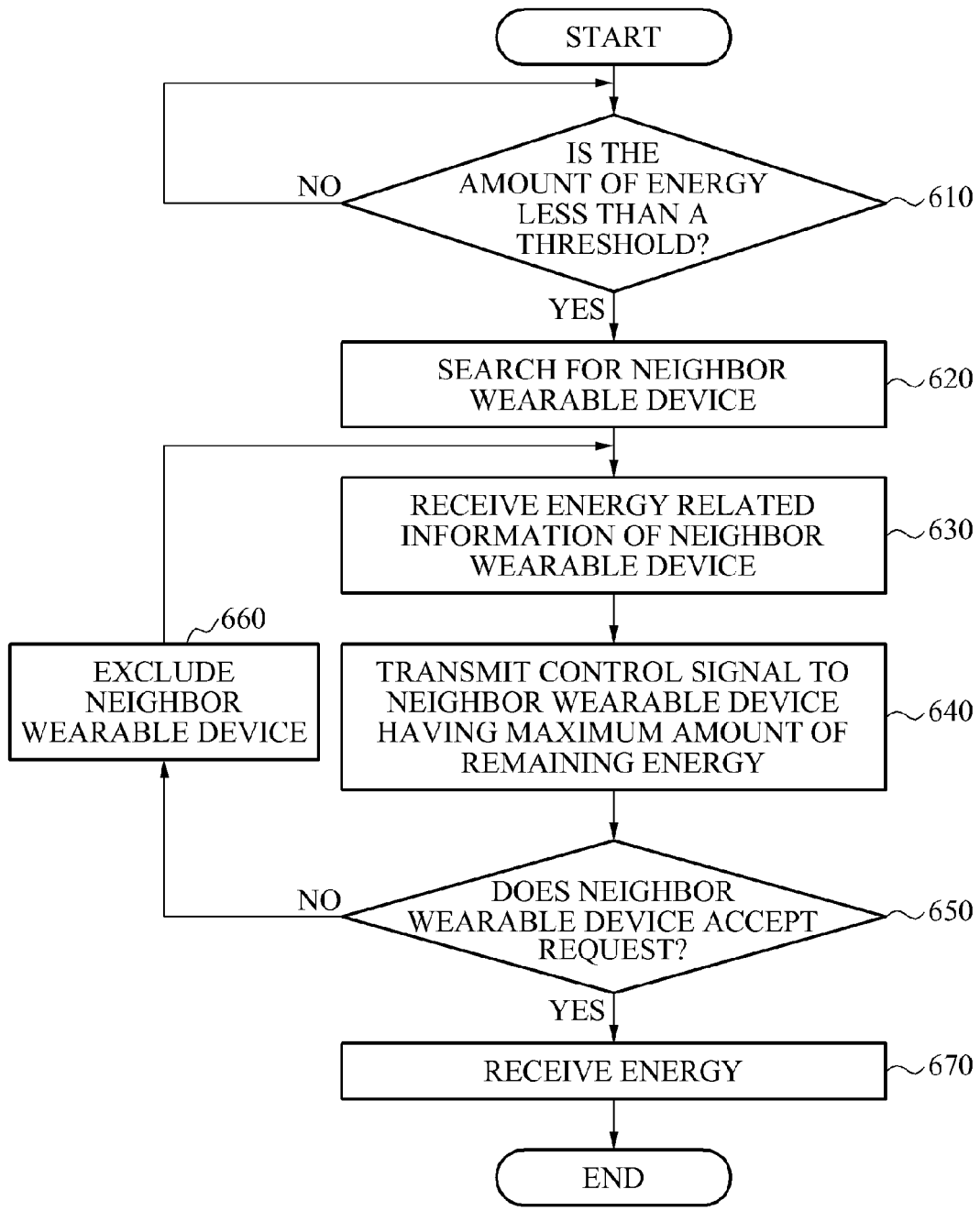

METHOD AND WEARABLE DEVICE FOR ENERGY SHARING NETWORK

CROSS-REFERENCE TO RELATED APPLICATION

This application claims the benefit under 35 U.S.C. §119(a) of Korean Patent Application No. 10-2013-0031421, filed on Mar. 25, 2013, in the Korean Intellectual Property Office, the entire disclosure of which is incorporated herein by reference for all purposes.

BACKGROUND

1. Field

The following description relates to a method and device to share energy between wearable devices and to configure an energy sharing network.

2. Description of the Related Art

Portable electronic devices, such as, for example, smart phones, tablet personal computers (PCs), and personal digital assistants (PDAs) are increasingly being used. To enhance portability of the portable electronic devices, wearable device that can be worn is being emphasized. Some examples of such wearable devices may be devices such as, for example, a cell phone, a smart phone, a pair of glasses, a bracelet, a watch, a device embedded in the cloths or attached to the body etc. In general, a battery is used as a power source for such electronic devices. The battery is charged using a charger including an adapter for a predetermined period of time. After the battery is charged, it may supply stable operational power to the wearable device. Accordingly, the battery needs to be periodically charged and/or replaced for continuous use of the wearable device.

When a user is outdoors for long hours, the user may need to carry a charger capable of charging the battery, or may need to carry an extra battery for situations where charging is not feasible. Further, a few hours may need to be used for charging. Thus, when using a battery as a power source of a wearable device, portability of the wearable device may be degraded and a use time may be constrained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a device and a method for an energy sharing network may include an energy store configured to store energy; an energy transmitter-receiver configured to transmit energy and energy related information to at least one neighbor device and to receive energy and energy related information from at least one neighbor device; and a controller configured to control the energy transmitter-receiver based on a predetermined condition.

An energy generator may be configured to generate energy and to store the generated energy in the energy store.

The energy generator may include at least one of a piezoelectric power generator, a solar cell, an acoustic noise power generator, a temperature difference power generator, a nanogenerator, or a radio frequency (RF) wave power generator.

The controller may be configured to control the energy transmitter-receiver to search for the neighbor device when the energy in the energy store is less than a predetermined threshold.

The controller may be configured to control the energy transmitter-receiver to transmit a predetermined control signal to request energy sharing to the neighbor device when the energy in the energy storage is less than a predetermined threshold.

The controller may be configured to control the energy transmitter-receiver to transmit the predetermined control signal to a neighbor device having a greatest amount of energy, based on the energy related information.

The controller may be configured to control the energy transmitter-receiver to transmit the energy to a neighbor device when an amount of energy in the energy store is greater than a predetermined boundary value at a time when a predetermined control signal to request energy sharing is received.

The energy transmitter-receiver may be configured to transmit energy to and receive energy from the at least one neighbor device that satisfies the predetermined condition.

The energy transmitter-receiver may be configured to interact with the neighbor device using a magnetic near field channel.

The energy transmitter-receiver may include a magnetic near field antenna.

The energy store may include at least one of a super capacitor, a lithium ion rechargeable battery, a power supplier or a thin film battery.

In another general aspect, there is provided a method of sharing energy, the method includes monitoring a first amount of energy in a device; receiving energy related information from a neighbor device; and sharing energy with the neighbor device by transmitting and receiving a second amount of energy and the energy related information.

The method may include generating energy; and storing the generated energy.

The receiving of the energy related information may include searching for the neighbor device when the first amount of energy in the device is less than a predetermined threshold.

The sharing of the energy may include transmitting a predetermined control signal to request energy sharing to the neighbor device when the first amount of energy in the device is less than a predetermined threshold; and receiving the second amount of energy from the neighbor device.

The sharing includes transmitting the predetermined control signal to a neighbor device having a greatest amount of energy, based on the energy related information.

The sharing may include transmitting the energy to the neighbor device when the amount of energy in the device is greater than a predetermined boundary value at a point in time when the predetermined control signal for requesting energy sharing is received.

The sharing may include transmitting the energy in the case of accepting a request for sharing energy in response to a predetermined control signal for requesting energy sharing.

The sharing may include sharing the energy with at least one device that satisfies the predetermined condition.

A non-transitory computer-readable storage medium having thereon a program to execute the energy sharing method with a computer.

In another general aspect, there is provided a method of sharing energy between devices, the method includes monitoring a energy level of a first device; obtaining, at the first device, energy related information from a second device; and receiving, at the first device, a first amount of energy from the second device.

The obtaining of the energy related information may include searching for the second device; transmitting a predetermined control signal to the second device to request energy related information; and receiving the energy related information from the second device.

The searching for the second device may include searching for the second device when the energy level of the first device is less than a predetermined threshold.

The receiving the first amount of energy may include transmitting a predetermined control signal to request energy transfer to the second device when the energy level is below a predetermined threshold; and receiving the first amount of energy from the second device.

The method of sharing energy between devices may include transmitting a second amount of energy from the first device to the second device.

The transmitting of the second amount of energy may include transmitting the second amount of energy to the second device when the energy level of the first device is greater than a predetermined boundary value at a point in time when a request for energy transfer is received.

Other features and aspects will be apparent from the following detailed description, the drawings, and the claims.

BRIEF DESCRIPTION OF THE DRAWINGS

FIG. 6 is a illustrating another example of a method to configure an energy sharing network in a wearable device.

Figure 1:
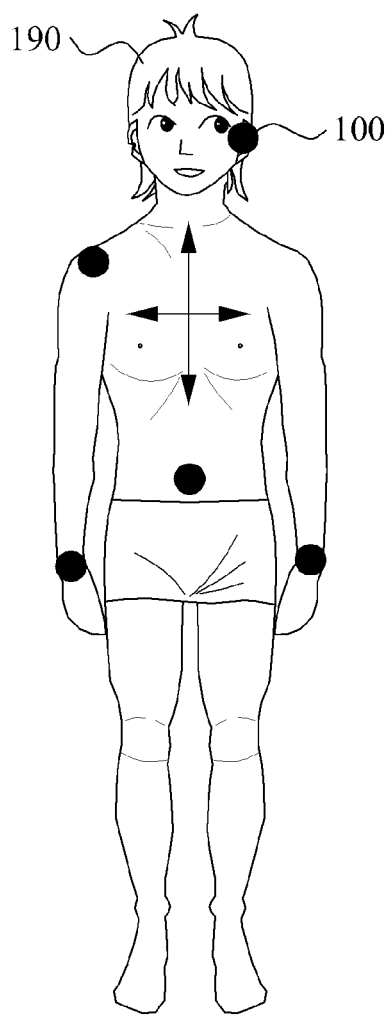
FIG. 1 is a diagram illustrating an example of wearable devices to configure an energy sharing network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a wearable device 100 to configure an energy sharing network. Referring to FIG. 1, the wearable device 100 may be an electronic device that is attached or removably mounted to a body by a user 190. According to a non-exhaustive example, a plurality of wearable devices 100 attached to the body of the user 190 may wirelessly transmit and receive power using, for example, a magnetic near field channel, to enable energy sharing between the plurality of wearable devices 100. Accordingly, by configuring an energy sharing network between the plurality of wearable devices, it is possible to increase the time period that the wearable device 100 can be used without interruptions.

According to a non-exhaustive example, the wearable device 100 may perform wireless energy transmission using a magnetic near field channel in a near field at high efficiency without being affected by a body medium. For example, the magnetic near field channel may provide the wireless energy transmission of 10% or more within a distance of about 1 m. By including an antenna and a controller for energy transmission using the above magnetic near field channel, an energy sharing network may be configured between the plurality of wearable devices 100. The convenience of the user 190 may be enhanced because wireless energy sharing is enabled between the plurality of wearable devices 100.

Figure 2:
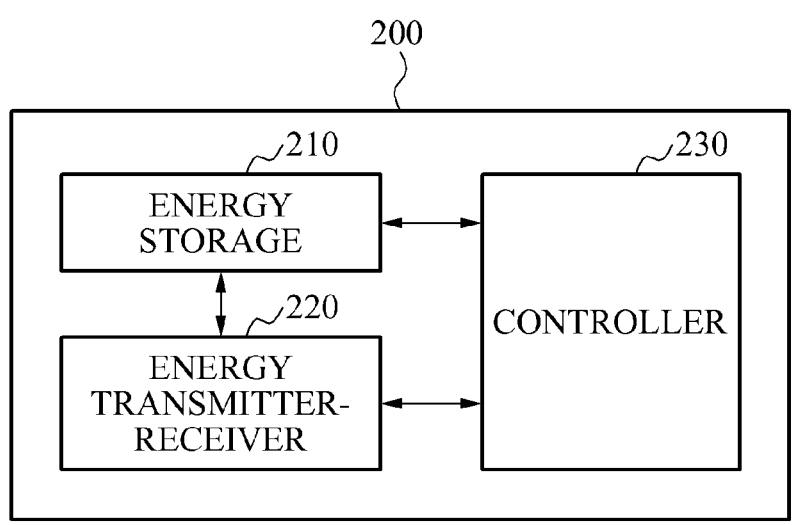
FIG. 2 is a diagram illustrating an example of a wearable device to configure an energy sharing network.

FIG. 2 illustrates an example of a wearable device 200 to configure an energy sharing network. Referring to FIG. 2, the wearable device 200 includes an energy store 210, an energy transmitter-receiver 220, and a controller 230. The energy store 210 may be an apparatus to supply operational power to the wearable device 200, and may include, but is not limited to, a super capacitor, a lithium ion (Li-ion) rechargeable battery, a thin film battery, and a power supplier. To efficiently use the wearable device 200, the form factor of the energy store 210 may need to be minimized and the time that it can be used continuously, without being recharged, may need to be maximized. Due to constraints in the form factor of the wearable device 200, the maximum capacity of an energy store 210 may be limited. Accordingly, there is a need to efficiently use the limited energy resources.

The energy transmitter-receiver 220 may interaction with a neighbor wearable device to transmit and receive energy and energy related information. In response to a command from the controller 230, the energy transmitter-receiver 220 may search for a neighbor wearable device to request energy sharing. To conduct energy sharing, the energy transmitter-receiver 220 may transmit a predetermined control signal to the neighbor wearable device, or may receive the predetermined control signal from the neighbor wearable device. The neighbor wearable device may be a device that is present within a predetermined distance of the wearable device 200. The neighbor wearable device may be capable of communicating with the wearable device 200. For example, the energy transmitter-receiver 220 may search for a neighbor wearable device that is present within a radius of about 1 m of the wearable device 200.

The neighbor wearable device may also be transmitting to and receiving energy from the wearable device 200 using a magnetic near field channel. For example, the energy transmitter-receiver 220 may receive energy from at least one neighbor wearable device that satisfies a predetermined condition. As another non-exhaustive example, the energy transmitter-receiver 220 may simultaneously receive energy from a plurality of neighbor wearable devices. As another non-exhaustive example, when predetermined conditions are satisfied, the energy transmitter-receiver 220 may transmit energy to at least one neighbor wearable device.

The energy transmitter-receiver 220 may interact with a neighbor wearable device using a magnetic near field channel. For example, the energy transmitter-receiver 220 may include a magnetic near field antenna and a device that provides the magnetic near field channel.

The controller 230 may control the energy transmitter-receiver 220 so that the energy stored in the energy store 210 is shared with neighbor wearable devices, based on predetermined conditions. The predetermined condition may include, but is not limited to, an amount of energy in the wearable device 200 and other energy related information. For example, the amount of energy may indicate an amount of charged energy in the energy store 210 of the wearable device 100. The energy related information may include information, such as, for example, an amount of charged energy in a neighbor wearable device, energy transmission efficiency, and an energy transmission distance.

The predetermined condition may also include conditions, such as, for example, whether an amount of energy is less than a predetermined threshold, whether an amount of energy is greater than a boundary value based on energy related information received from the neighbor wearable device, and whether a predetermined control signal for requesting energy sharing is accepted by the neighbor wearable device.

When an amount of charged energy in the energy store 210 is less than a predetermined threshold, the controller 230 may control the energy transmitter-receiver 220 to search for neighbor wearable devices to request energy sharing. In this case, the predetermined threshold may indicate a minimum amount of energy that guarantees a normal operation of the wearable device 200.

As another non-exhaustive example, when an amount of charged energy in the energy store 210 is less than a predetermined threshold, the controller 230 may control the energy transmitter-receiver 220 to transmit a predetermined control signal to request energy sharing to a neighbor wearable device. In this example, the neighbor wearable device is a device that is identified in advance through a search.

As another non-exhaustive example, the controller 230 may control the energy transmitter-receiver 220 to transmit the predetermined control signal to a neighbor wearable device having the maximum amount of energy, based on energy related information. In this example, the neighbor wearable device having the maximum amount of energy is a device having a maximum amount of charged energy among neighbor wearable devices that are identified in advance through a search.

When a predetermined control signal requesting energy sharing is received or when an amount of charged energy in the energy store 210 is greater than a predetermined boundary value, the controller 230 may control the energy transmitter-receiver 220 to transmit the energy to a neighbor wearable device, which has transmitted the predetermined control signal. In this example, the boundary value may be an amount of energy that guarantees a normal operation of the wearable device 200 for at least a predetermined period of time.

The controller 230 may include a non-transitory computer-readable medium storing at least one program that includes instructions to configure an energy sharing network in the wearable device 200.

Figure 3:
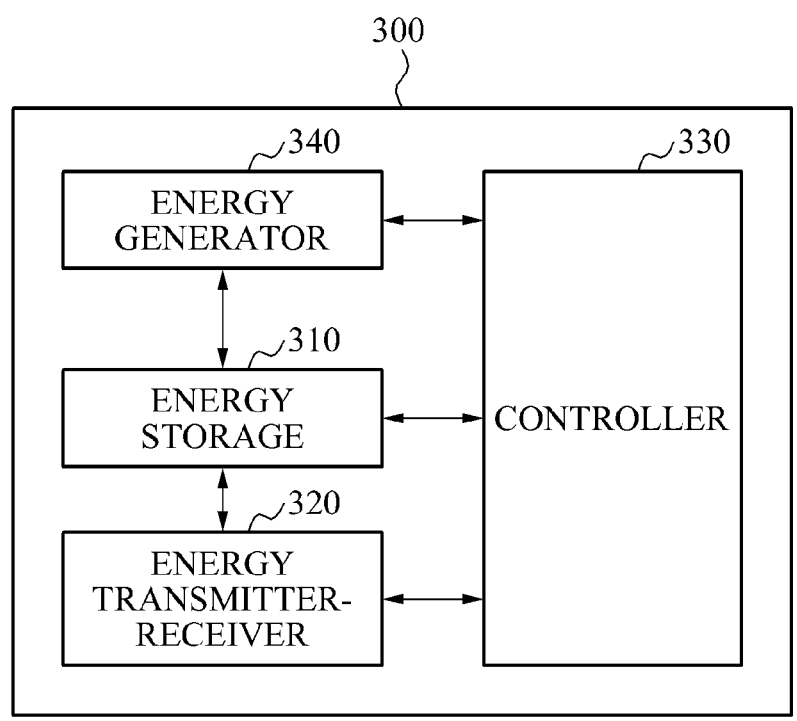
FIG. 3 is a diagram illustrating another example of a wearable device to configure an energy sharing network.

FIG. 3 illustrates another example of a wearable device 300 to configure an energy sharing network. Referring to FIG. 3, the wearable device 300 includes an energy store 310, an energy transmitter-receiver 320, a controller 330, and an energy generator 340. The energy store 310, the energy transmitter-receiver 320, and the controller 330 of FIG. 3 may operate similar to the energy store 210, the energy transmitter-receiver 220, and the controller 230 of FIG. 2, respectively. Thus, the description of these components will not be repeated here.

The energy generator 340 may harvest energy and charge the energy store 310. The energy generator 340 may include energy generators, such as, for example, a piezoelectric power generator, a solar cell, an acoustic noise power generator, a temperature difference power generator, a nanogenerator, and a radio frequency (RF) wave power generator.

Figure 4:
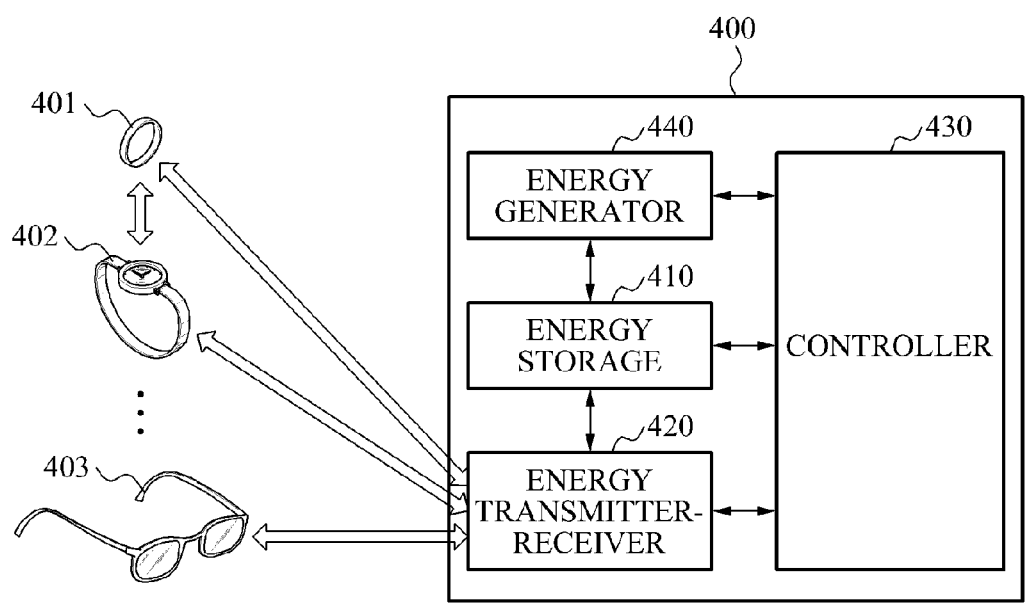
FIG. 4 is a diagram illustrating an example of sharing energy between a plurality of energy devices.

FIG. 4 illustrates an example of sharing energy between a plurality of energy devices, for example, a wearable device 400 and neighbor wearable devices 401, 402, and 403.

Referring to FIG. 4, the wearable device 400 may configure an energy sharing network together with neighbor wearable devices 401, 402, and 403. An energy store 410, an energy transmitter-receiver 420, a controller 430, and an energy generator 440 included in the wearable device 400 may perform functionality similar to the energy store 310, the energy transmitter-receiver 320, the controller 330, and the energy generator 340 of FIG. 3, respectively. Thus, the description of these components will not be repeated here.

The wearable device 400 and the neighbor wearable devices 401, 402, and 403 may include various types of devices that can be mounted or removably attached to a body of a user. As a non-exhaustive illustration only, the wearable devices may be devices, such as, for example, a cellular phone, a smart phone, a ring, a watch, a pair of glasses, a bracelet, an ankle bracket, a belt, a necklace, an earring, a headband, an armband, a lanyard, a helmet, a device embedded in the cloths, other accessories, a tablet personal computer (PC), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a desktop PC, a high definition television (HDTV), an optical disc player, a setup box, and the like capable of wireless communication or network communication consistent with that disclosed herein. The wearable device may be self-mountable on the body of the user, such as, for example, the glasses or the bracelet. In another non-exhaustive example, the wearable device may be mounted on the body of the user through an attaching device, such as, for example, attaching an smart phone or a tablet to the arm of a user using an armband. In another non-exhaustive example, the GPS, portable game console, MP3 player, PMP may be worn around the neck of the user with a lanyard.

The wearable device 400 may share energy with at least one of the neighbor wearable devices 401, 402, and 403. For example, the wearable device 400 may share the energy with a single neighbor wearable device, or may share the energy with a plurality of neighbor wearable devices. In this example, the wearable device 400 may, simultaneously or sequentially, share energy with the plurality of neighbor wearable devices 401, 402, and 403.

For example, the wearable device 400 may sequentially sharing energy with N neighbor wearable devices, where N denotes a natural number of "1" or more. The wearable device 400 initially receives energy from a first neighbor wearable device. When the amount of energy of the first neighbor wearable device becomes less than a boundary value, the wearable device 400 may receive energy from a second neighbor wearable device. Such sequential energy sharing may be performed until the energy of the wearable device 400 is fully charged, or if the amounts of energy of all N neighbor wearable devices become less than a boundary value.

Figure 5:
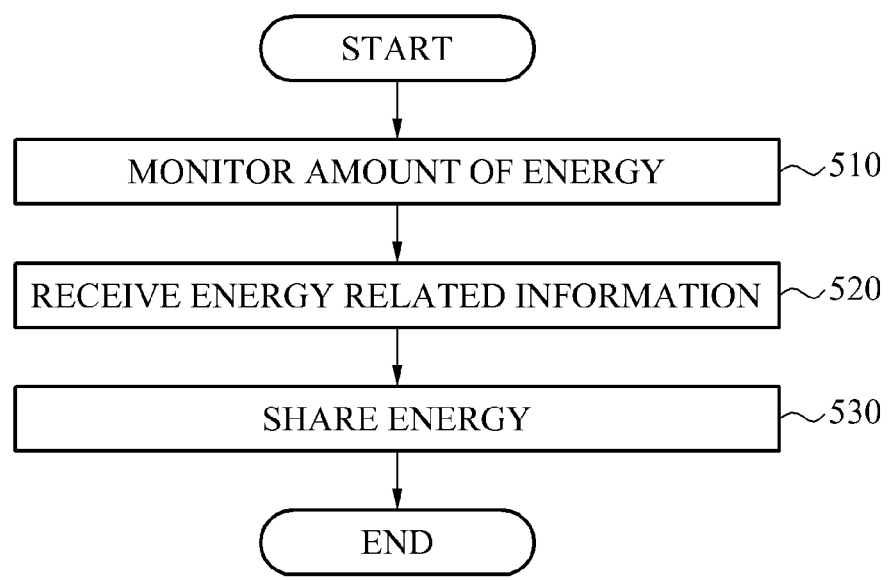
FIG. 5 is a illustrating an example of a method to configure an energy sharing network in a wearable device.

FIG. 5 illustrates an example of a method to configure an energy sharing network in a wearable device. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The description of FIGS. 1-4 is also applicable to FIG. 5, and thus will not be repeated here.

In 510, a controller monitors the amount of energy in the wearable device. For example, the controller may monitor an amount of charged energy in an energy storage in real time or at predetermined intervals.

In 520, the wearable device receives energy related information from a neighbor wearable device through an energy transmitter-receiver, which interacts with the neighbor wearable device. The wearable device may search for a neighbor wearable device to request energy sharing, before commencing interaction with the neighbor wearable device. In another non-exhaustive example, the neighbor wearable device may be identified in advance through a search.

In 530, the wearable device shares energy with the neighbor wearable device by transmitting and receiving the energy using the energy transmitter-receiver based on a condition that is predetermined with respect to an amount of energy and energy related information. For example, when an amount of charged energy in the energy storage is less than a predetermined threshold, the wearable device may search for a neighbor wearable device.

As another example, when an amount of charged energy in the energy storage is less than a predetermined threshold, the wearable device may transmit a predetermined control signal to request energy sharing with a neighbor wearable device and may receive the energy from the neighbor wearable device using the energy transmitter-receiver. In this example, the neighbor wearable device may be a device that is found in advance through search. For example, when a plurality of neighbor wearable devices is found, the wearable device may transmit a predetermined control signal to request energy sharing with a neighbor wearable device having a maximum amount of energy among the found neighbor wearable devices.

When a predetermined control signal requesting energy sharing is received, and an amount of charged energy in the energy storage is greater than a predetermined boundary value, the wearable device may transmit energy to a neighbor wearable device, which transmitted the predetermined control signal using the energy transmitter-receiver. In the case of accepting a request for sharing energy in response to the predetermined control signal, the wearable device may transmit the energy using the energy transmitter-receiver. In a non-exhaustive example, the wearable device may share the energy with at least one neighbor wearable device by transmitting and receiving the energy to and from the at least one neighbor wearable device.

In a non-exhaustive example, the wearable device may generate energy, and the generated energy may be stored in the energy storage 210, 310, or 410.

FIG. 6 illustrates another example of a method to configure an energy sharing network in a wearable device. The operations in FIG. 5 may be performed in the sequence and manner as shown, although the order of some operations may be changed or some of the operations omitted without departing from the spirit and scope of the illustrative examples described. Many of the operations shown in FIG. 6 may be performed in parallel or concurrently. The description of FIGS. 1-5 is also applicable to FIG. 6, and thus will not be repeated here.

In 610, the wearable device is monitored to determine whether an amount of energy of the wearable device is less than a predetermined. When the amount of energy is less than the predetermined threshold, operation 620 is performed. Else, the energy of the wearable device may continue to be monitored.

In 620, when the amount of energy is less than the predetermined threshold, the wearable device searches for a neighbor wearable device using an energy transmitter-receiver. In a non-exhaustive example, when a plurality of neighbor wearable devices are found, the wearable device may create a list of neighboring wearable devices. In 630, the wearable device receives energy related information from the found neighbor wearable device.

In 640, the wearable device transmits a predetermined control signal to request energy sharing with the neighbor wearable device having the maximum amount of charged energy among the neighbor wearable devices found in 630. In 650, the neighbor wearable device receiving the predetermined control signal determines whether to accept the request for sharing energy using a controller.

In 660, when the request to share energy is not accepted by the neighbor wearable device, the wearable device excludes the corresponding neighbor wearable device from the list of neighboring wearable devices and repeats the process from 630.

In 670, when the request is accepted by the neighbor wearable device, the wearable device receives energy from the neighbor wearable device using the energy transmitter-receiver.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device comprising:
   an energy store configured to store energy;
   an energy transmitter-receiver configured to transmit energy of the energy store and energy information to at least one neighbor device and to receive energy and energy information from the at least one neighbor device; and
   a controller configured to control the energy transmitter-receiver based on one or more predetermined conditions,
   wherein one of the predetermined conditions includes whether an amount of energy in the energy store is determined to be greater than a predetermined boundary amount at a time when a predetermined control signal requesting energy sharing is received by the device.

2. The device of claim 1, further comprising:
   an energy generator configured to generate energy and to store the generated energy in the energy store.

3. The device of claim 2, wherein the energy generator comprises at least one of a piezoelectric power generator, a solar cell, an acoustic noise power generator, a temperature difference power generator, a nanogenerator, or a radio frequency (RF) wave power generator.

4. The device of claim 1, wherein the controller is configured to control the energy transmitter-receiver to search for the at least one neighbor device when the stored energy in the energy store is determined to be less than a predetermined threshold, as one of the predetermined conditions.

5. The device of claim 1, wherein the controller is configured to control the energy transmitter-receiver to transmit a predetermined control signal to request energy sharing from the at least one neighbor device when the stored energy in the energy store is determined to be less than a predetermined threshold, as one of the predetermined conditions.

6. The device of claim 5, wherein the controller is configured to control the energy transmitter-receiver to transmit the predetermined control signal to a select neighbor device, of plural identified neighbor devices, determined to have a greatest amount of energy, based on respectively received energy information from the identified neighbor devices.

7. The device of claim 1, wherein the controller is configured to control the energy transmitter-receiver to transmit the energy of the energy store to the at least one neighbor device when the amount of energy in the energy store is determined to be greater than the predetermined boundary value at the time when the predetermined control signal to request the energy sharing is received.

8. The device of claim 1, wherein the energy transmitter-receiver is configured to selectively transmit energy to and receive energy from the at least one neighbor device based on whether the received energy information from the at least one neighbor device and/or information of the stored energy satisfies one or more of the predetermined conditions.

9. The device of claim 1, wherein the energy transmitter-receiver is configured to interact with the at least one neighbor device using a magnetic near field channel.

10. The device of claim 1, wherein the energy transmitter-receiver comprises a magnetic near field antenna.

11. The device of claim 1, wherein the energy store comprises at least one of a super capacitor, a lithium ion rechargeable battery, a power supplier or a thin film battery.

12. The device of claim 1, wherein the device and the at least one neighbor device are wearable devices.

13. A method of sharing energy, the method comprising:
    monitoring an amount of available energy in a device;
    receiving, by the device, energy information from a neighbor device; and
    controlling the device to share energy with the neighbor device based on the received energy information, by transmitting or receiving energy respectively to or from the neighbor device based on the monitored amount of available energy in the device,
    wherein the transmitting of the energy to the neighbor device includes transmitting the energy to the neighbor device based on a determination that the monitored amount of available energy in the device is greater than a predetermined boundary value at a point in time when a predetermined control signal from the neighbor device for requesting energy sharing is received.

14. The method of claim 13, further comprising the device generating and storing energy in an energy store of the device.

15. The method of claim 13, wherein the receiving of the energy information comprises searching for the neighbor device when the monitored amount of available energy in the device is determined to be less than a predetermined threshold.

16. The method of claim 13, wherein the sharing of the energy with the neighbor device comprises:
    controlling the device to transmit a predetermined control signal from the device to the neighbor device to request sharing of energy from the neighbor device when the monitored amount of available energy in the device is determined to be less than a predetermined threshold; and
    receiving, by the device, an amount of energy from the neighbor device based on a response to the predetermined control signal from the neighbor device.

17. The method of claim 16, wherein the controlling of the device to transmit the predetermined control signal comprises:
    transmitting the predetermined control signal from the device to a select neighbor device determined to have a greatest amount of energy among plural identified neighbor devices, based on respectively received energy information from the plural identified neighbor devices indicating respective available energies.

18. The method of claim 13, wherein the sharing of the energy with the neighbor device comprises:
    receiving the predetermined control signal from the neighbor device;
    transmitting, in response to the received predetermined control signal, an acceptance indicating signal to the neighbor device that indicates an acceptance by the device to transfer energy to the neighbor device; and
    transmitting, based on the transmitted acceptance indicating signal, the energy to the neighbor device.

19. The method of claim 13, wherein the sharing of the energy with the neighbor device comprises:
selectively sharing respective amounts of energy stored in the device with plural neighbor devices.

20. A non-transitory computer-readable storage medium having thereon a program to execute the energy sharing method of claim 13 with a computer.

21. The method of claim 13, wherein the device and the neighbor device are wearable devices.

22. A method of sharing energy between devices, the method comprising:
monitoring an energy level of a first device;
obtaining, at the first device, energy information from a second device;
receiving, at the first device, an amount of energy from the second device based on the monitored energy level of the first device and the obtained energy information; and
transmitting energy from the first device to the second device based on a determination of whether the monitored energy level of the first device is greater than a predetermined boundary value at a point in time when a request for energy transfer is received.

23. The method of claim 22, wherein the obtaining of the energy information comprises:
searching for neighbor devices, to identify neighbor devices, including the second device;
transmitting, by the first device, respective predetermined control signals to each of the identified neighbor devices to request energy information of each of the neighbor devices; and
receiving the requested energy information from the neighbor devices.

24. The method of claim 23, wherein the searching for the neighbor devices comprises searching for the neighbor devices when the monitored energy level of the first device is determined to be less than a predetermined threshold.

25. The method of claim 22, wherein the receiving of the amount of energy comprises:
transmitting, by the first device, a predetermined control signal requesting energy transfer from the second device when the monitored energy level is determined to be below a predetermined threshold; and
selectively receiving the amount of energy from the second device based on a response to the predetermined control signal from the second device.

26. The method of claim 22, wherein the first and second devices are wearable devices.

* * * * *